Sept. 16, 1958  F. W. REINHART ET AL  2,852,424
REINFORCED PLASTIC SPRINGS
Filed April 30, 1957
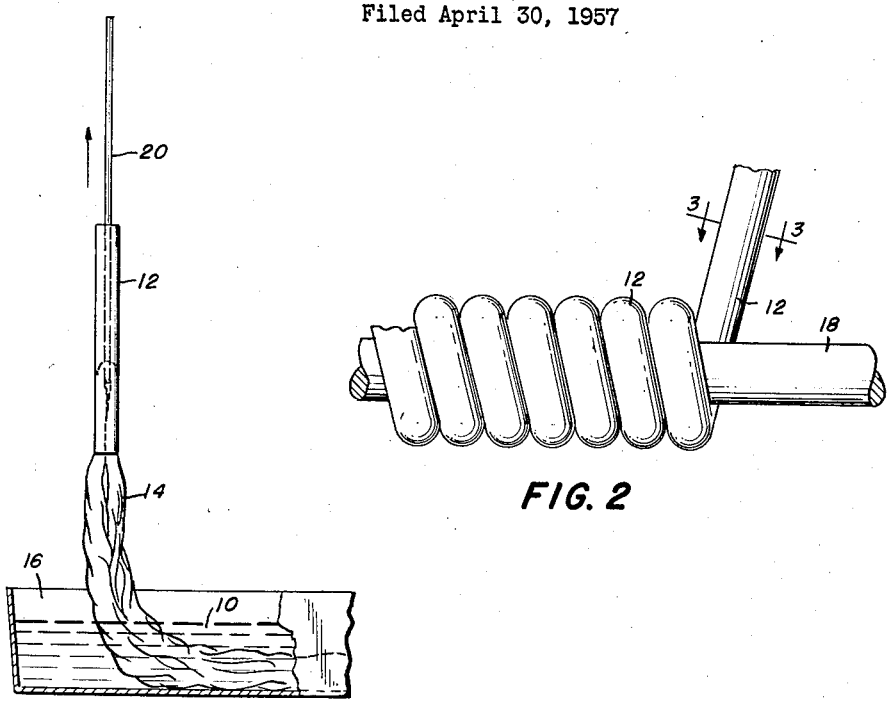
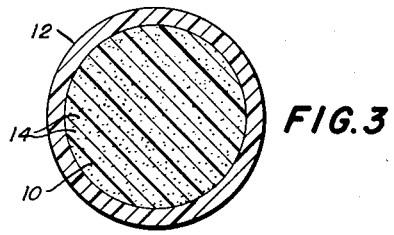
FIG. 3
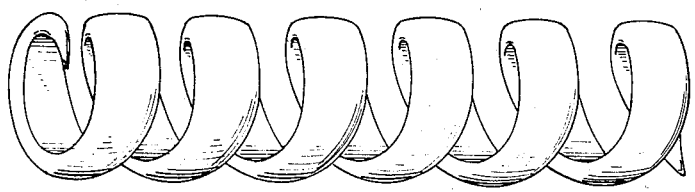
FIG. 4
INVENTORS
**FRANK W. REINHART
MURRAY C. SLONE
LEON HORN**
BY DESMOND A. GEORGE

United States Patent Office 2,852,424
Patented Sept. 16, 1958

2,852,424

REINFORCED PLASTIC SPRINGS

Frank W. Reinhart, Silver Spring, Md., Murray C. Slone, La Mesa, Calif., Leon Horn, Silver Spring, Md., and Desmond A. George, Arlington, Va., assignors to the United States of America as represented by the Secretary of the Army Application April 30, 1957, Serial No. 656,158

8 Claims. (Cl. 154—90)

(Granted under Title 35, U. S. Code (1952), sec. 266)

The invention described herein may be manufactured and used by or for the Government for governmental purposes without the payment to us of any royalty thereon.

In general, this invention relates to plastic springs. More specifically, plastic springs having novel and unique characteristics, and their fabrication, are the subject matter of this application.

Polymeric resin substances are possessed with properties which recommend their use for springs for special purposes. For example, a significant number of these substances are non-magnetic, have low electrical as well as thermal conductivity, and high corrosion resistance. Some applications may benefit from the strength-to-weight ratios of plastics which are often higher than those obtained with spring making metals. With the vast range of transparent and colored materials, striking decorative effects are also possible by plastics, as well as desirable color coding effects. Plastic helical springs may be conveniently molded directly to dimension without the development of any considerable internal stress as is prevalent in helical metallic springs manufactured by normal techniques. However, the torsional properties and energy residual and recovery properties for pure plastic springs are not satisfactory. Additionally, present manufacturing techniques for plastic springs do not lend themselves to mass production methods at comparatively low costs.

Accordingly, an object of this invention is to provide a spring having the desirable characteristics and attributes of plastic springs coupled with superior torsional and energy residual and recovery properties.

Another object is to provide a plastic spring, the properties of which may be widely varied.

Still another object is to provide a spring that requires, for its fabrication, no critical materials.

A further object is to provide a plastic spring capable of functioning over a relatively wide temperature range.

An additional object is to provide a plastic spring that may be easily fabricated by mass production methods.

A principal object of this invention is to provide an inexpensive, economical, efficient method for mass production of plastic springs.

An important object is a method for manufacturing plastic springs into a variety of shapes and sizes having a variety of physical properties.

A further important object is to provide a method for fabricating a glass reinforced plastic spring possessing considerable homogeneity.

Briefly, this invention presents glass reinforced plastic springs. A manufacturing technique for these springs may feature soaking a glass or other fibered reinforcing means in a resinous solution. The resin soaked reinforcing means is next drawn into a length of tubing. A suitable portion of the tubing is then sealed off, and the tubing wound around a mandrel to form a spring-shaped structure. The reinforced resin structure is then properly cured to form a spring, and the tubing then removed from the spring.

The specific nature of the invention as well as other objects, uses and advantages thereof will clearly appear from the following description and from the accompanying drawing, in which:

Figure 1 is a partially schematic showing of the essentials for carrying out the present invention with certain parts broken away.

Figure 2 is a partial elevational view of a length of tubing, enclosing a reinforced resin, on a mandrel in accordance with this invention.

Figure 3 is a cross-sectional view taken substantially along line 3—3 of Figure 2.

Figure 4 is a perspective view of a spring fabricated by the present invention.

One of the most successful procedures contemplated by this invention is the polymerization of a liquid resin composition 10 in a length of tubing 12.

Referring to Figure 1, lengths of glass rovings 14 are formed into a loose untwisted yarn. Rovings 14 are then placed in a trough 16 partly filled with liquid resin 10 and immersed therein until the rovings 14 are thoroughly soaked. The impregnated rovings 14 are then drawn into the tubing 12 or placed therein in any suitable manner. When the tubing 12 is completely filled or filled to the desired length, the ends or the desired length is then sealed, as for example, by conventional hose clamps (not shown).

The sealed tubing 12 is then wound in a helix on a suitable mandrel 18, as partially shown in Figure 2. To maintain the spiraled tubing 12 in position for obtaining the desired configuration, the ends thereof are restrained sufficiently in any suitable manner. Curing of the tube enclosed resin 10 is then performed, to the extent required, dependent upon the type resin 10 utilized. After proper curing, the tubing 12 is then removed. Post curing may be performed in certain cases where required.

Finally, the springs may be cut and ground, if desired, to a finished length. The result is the spring illustrated in Figure 4.

The most satisfactory materials for resin 10 because of their torsional moduli and temperature sensitivity were found to be known epoxides and polyesters. The epoxy resins are generally less sensitive to temperature. Additionally the properties of the epoxy resins were little affected by the amount of curing agent employed. Plasticizers were found to increase the permanent set of the resin 10 at elevated temperatures. Commercial catalysts and curing agents, and in general, those recommended by the resin suppliers may be used in curing the spring-shaped structures. Curing time for epoxy resins may range from three hours at 167° F. to fifteen hours at 137° F., with post cure ranging up to forty-eight hours at 212° F., or for four hours at 302° F. For polyesters the cure time may range from four hours at 73° F. to one hour at 158° F., with a post cure up to one hour at 183° F. As will be evident to those skilled in the art, these ranges are not inclusive and may be varied for a particular application.

Depending upon the particular application of a spring, other resins may find a limited use for resin 10. If spring use is contemplated for cold ambient conditions, thermoplastics or other thermosetting resins may be employed. Spring rigidity will be found to increase as the temperature decreases. Thus plastics that are unsatisfactory for use at normal ambient conditions may possess sufficient rigidity for applications under decreased temperatures. Another determining factor in the type of resin 10 employed is its ability to bond sufficiently to the reinforcement 14 to provide a unitary-functioning spring structure. The essential criterion for the choice of resin 10 is that it should be available in a liquid form that will polymerize to a substantially solid-state upon proper curing. Materials that have performed satisfactorily for resin 10 upon specific applications were phenolics, polyamides, butadiene-low styrene copolymers, butadiene-butyl acrylate rubbers, silicone rubbers, butadiene-alkyl acrylate copolymers, and polyvinyl acetate.

Vinyl chloridevinyl acetate copolymer has performed satisfactorily for tubing 12. Other materials possessing the required degree of flexibility, elasticity, resiliency, and relative inertness to the materials and conditions which this invention contemplates in achieving the desired results may be employed in fabricating tubing 12. Tubing 12 may be removed from the cured resin 10 in any suitable manner or by any suitable means, utilizing stripping, slitting, peeling, or slipping phenomena, to mention a few. To prevent portions of tubing 12 from adhering or fuzing with resin 10, if this be a problem, the tubing may first be heated at approximately 120° C. for approximately two hours or until it beings to discolor before passing the resin soaked glass rovings therethrough. As will become evident the number of spring coils per unit length may be decreased by using tubing 12 of greater wall thickness. Spring dimensions may be similarly varied as required by other applications by decreasing the wall thickness of tubing 12 or varying the internal diameter of tubing 12.

The glass rovings 14 may be attached to a leading end of a wire 20 or other suitable means for passing the resin soaked rovings 14 through tube 12. Rovings 14 may also be formed into a loose, untwisted yarn and then doubled to form a U-shaped bundle. The leading end of wire 20 may then be attached to the bend in the U-shaped bundle for purposes of inserting the resin soaked rovings 14 into tube 12, the wire 18 being subsequently retracted. In any event, the wire 20 should be removed from the rovings 14 prior to sealing the end of tube 12 for the curing stage where necessary. The glass rovings 14 may be formed with a chrome finish or other glass finish to promote the maintenance of spring strength under certain atmospheric or ambient conditions. Glass roving reinforcement increases the potential energy and storage capacity of the plastic springs. To insure production of stress in the rovings 14 when the plastic spring is subjected to tension, compression or torsion, the rovings may be braided or knotted. Although this procedure may cause local variations and irregularities in the density of an otherwise relatively homogeneous spring, the gain in elastic recovery will more than compensate for any loss in the maximum strength of the spring. Up to a seven percent or more increase in recovery may be attributable to a change in the form of the glass rovings 14. Braided and ribbon glass tape, as well as nylon, rayon and metallic filament among others may be adopted as a resin reinforcing means to some specific spring applications. If it is found that a concentration of glass reinforcing 14 is disposed toward the inner periphery of the springs, the filled tubing 12 can be subjected to an opposing twist when wrapping it around the mandrel 18 before the resin 10 curing stage. Stiffer and more brittle springs can be produced by suitably increasing the glass reinforcement 14 if this be desirable. The maximum reinforcement is conditioned on the suitable wetting of substantially all the exposed surfaces of the reinforcement by the resin 10 and relative ease in filling substantially all of the voids formed by the reinforcement by the resin.

In order to increase the desirable bonding between resin 10 and filaments 14, various finishes may be provided on the filaments. Of course this will depend upon the type material utilized for resin 10 and filaments 14. Those skilled in the art, with the particular materials utilized for resin 10 and filaments 14, can readily adapt known finishes for filaments 14 to accomplish suitable intended results.

It will be noted that the transverse size of the finished spring will depend on the diameter of the mandrel 18 that is selected, and accordingly, this dimensioning may be varied as desired for any particular spring application. With appropriately contoured mandrels, various spring designs are possible, such as barrel, conical and hour-glass shapes. The spring length and spring pitch may also be altered, prior to the curing stage, by suitable winding and spacing of the filled tubing 12 on a particular mandrel 18.

Of particular interest may be that in any specified spring the variation in the modulus of elasticity with temperature is primarily a function of the resin and, within limits, independent of the amount of glass reinforcement. The plastic springs with glass reinforcement additionally shows good energy recovery properties after short periods of storage from below —40° F. to 135° F. The modulus of rigidity and consequently torsional properties are remarkably improved by the glass reinforced springs as compared to springs made purely from a resin. More specifically, more than a four-fold increase in the modulus of rigidity was observed by the presence of the glass filaments in the spring.

One of the more successful glass reinforced springs to be described in detail for illustration only gave 0.5 inch deflection at a load of 25 pounds. The mean coil diameter of these springs was 0.75 inch, spring length 2 inches, and the coil wire diameter $3/16$ inch. The modulus of rigidity accordingly was slightly less than $1.0 \times 10^6$ lb./in.$^2$. These springs were composed of an epoxy resin commercially known as Epon 828 with five double rovings of glass (a total of 600 ends), cured with 15 percent of m-phenylene diamine. The filled vinyl plastic tubing on its selected mandrel were transferred to an air circulating oven for curing. The resin was brought to a B-stage after 3 hours at 70° C. before the vinyl plastic tubing having a $1/8"$ wall thickness was removed. The springs were then completely cured by heating at 60° C. for 64 hours or longer and 8–10 hours at 150° C. Over a hundred similarly fabricated springs while under a load of 25 pounds produced an average deflection of 0.53 inch with a standard deviation of 0.05 inch. Thus a high degree of homogeneity in static properties is possible in the springs produced by this procedure. A number of similar springs fabricated to 3 inches in length retained over 5 inch-pounds of energy after being compressed and held at their solid length for 13 days at 135° F. Since the energy decay curve of a helical spring is an exponential, the greatest loss of energy occurred during the first few days. After 30 days storage at this temperature, residual energies of at least 30 percent of the original were obtained. Substantial improvement in recoverable energy properties of springs was accordingly obtained by preloading the epoxide spring during storage or within thirty days before use.

Other compositions of plastic springs fabricated according to the teachings of the present invention that yielded satisfactory spring properties and characteristics are set forth in the following table:

| Sample | Resin | | Curing Agent | | Number of Glass Roving Loops in Reinforcement | Cure | | | |
|---|---|---|---|---|---|---|---|---|---|
| | | | | | | Initial | | Post | |
| | Designation | Amt., Percent | Designation | Amt., Percent | | Time, hr. | Temp., °C. | Time, hr. | Temp., °C. |
| 1 | Selectron 5003 | 99 | ATC | 2 | 6 | 4 | 50 | 2 | 110 |
|   | Selectron 4208 | 1 | ATC | 2 | | | | | |
| 2 | Vibrin X1422 | 98 | ATC | 2 | 5 | 1 | 70 | 2 | 120 |
|   | Spon 828 | 2 | Agent A | 6 | | | | | |
| 3 | Epon 828 | 100 | Agent A | 6 | 9 | 48 | 57 | 2 | 120 |
| 4 | ---do--- | 100 | ---do--- | 6 | 9 Braided | 48 | 57 | 2 | 120 |
| 5 | ---do--- | 100 | Agent D | 13 | 8 | 48 | 57 | 2 | 120 |
| 6 | ---do--- | 100 | Pyridine | 14 | 6 | 24 | 57 | 3 | 120 |
| 7 | ---do--- | 100 | Agent A | 7 | (C) | 4 | 62 | 48 | 100 |
| 8 | ---do--- | 100 | ---do--- | 7 | 10 Ribbon tape | 3, 15 | 75, 57 | 2 | 120 |
| 9 | Bakelite 142 | 100 | ATC | 3 | 6 | 4, 2 | 23, 60 | 1 | 84 |
| 10 | Stypol | 100 | DDM | 2 | 9 Bairded | 1 | 70 | ½ | 120 |

Selectron is a polyester styrene copolymer manufactured by Pittsburgh Plate Glass Co.
Vibrin is a polyester manufactured by Naugatuck Chemical, Division of U. S. Rubber Co.
Epon 828 is the epoxy, digylcidyl ether of bis (4-hydroxyphenyl)-2,2-propane, manufactured by Shell Chemical Co.
Bakelite 142 is an epoxy manufactured by the Bakelite Co.
Stypol is a polyester manufactured by the H. H. Robertson Co.
ATC is Luperco ATC, benzoyl peroxide-tricresyl phosphate, manufactured by Wallace & Tiernan, Inc.
Agent A is diethyl amino propyl amine manufactured by the Shell Chemical Co.
Agent D is 2-ethyl hexoic acid and 2, 4, 6-tri (dimethyl amino methyl) phenol manufactured by the Shell Chemical Co.
DDM is Luperco DDM, 60% methyl ethyl ketone peroxide in dimethyl phthalate, manufactured by Wallace & Tiernan, Inc.
Designation (C) denotes eighteen double loops of nylong made of 16 ends, 840 denier, 140 filaments, type 300, manufactured by Klug Engineering Service.
The glass roving reinforcement comprises a cord of glass roving which is doubled, possesses a chrome finish, and has 60 strands of glass fiber.

It will be apparent that the embodiments shown are only exemplary and that various modifications can be made in construction and arrangement within the scope of the invention as defined in the appended claims.

We claim:

1. A method of fabricating plastic springs comprising the steps of: impregnating filaments of glass rovings with a fluid resinous material; inserting said rovings in a coilable structure; coiling said structure; curing the resinous material impregnated in said rovings; removing said structure from said rovings.

2. A method of fabricating plastic springs comprising the steps of: placing rovings of glass filament in a liquid resinous bath; disposing said resin bathed rovings within a confining structure; coiling said confining structure; curing the liquid resin disposed in said resin bathed rovings; removing said confining structure from said rovings.

3. A method of fabricating plastic springs comprising the steps of: soaking glass rovings in a bath of a liquid resin; inserting a length of the resin soaked rovings into a length of tubing; winding said tubing around a mandrel having a selected configuration to form a coiled structure having a selected shape; curing said resin soaked into said rovings; and removing said tubing from said rovings.

4. A method of fabricating plastic springs comprising the steps of: attaching a length of wire to a length of glass rovings; soaking said rovings in a bath of a liquid resin; threading said wire through a length of tubing so that said tubing is substantially filled with said rovings; removing said wire from said rovings; clamping off a length of said tubing; winding said tubing around a mandrel having a selected configuration to form a coiled structure having a selected shape with both ends of said tubing secured against any movement; curing said resin soaked into said rovings; removing said tubing from said mandrel; and removing said tubing from said rovings.

5. A method of fabricating plastic springs comprising the steps of: doubling a length of glass rovings to form a U-shaped bundle; soaking said bundle in a bath of a liquid resin; attaching a length of wire to the bend of said U-shaped bundle; threading said wire through a length of tubing so that said tubing is substantially filled with said rovings of said bundle; removing said wire from said bundle; clamping off a length of said tubing; winding said tubing around a mandrel having a selected configuration to form a coiled structure having a selected shape with both ends of said tubing secured against any movement; curing said resin soaked into said bundle; removing said tubing from said mandrel; and removing said tubing from said bundle.

6. A method of fabricating plastic springs comprising the steps of: soaking a length of glass rovings in a bath of liquid resin; inserting a length of the resin soaked rovings into a length of tubing; clamping off a length of said tubing; winding said tubing around a mandrel having a selected configuration to form a coiled structure having a selected shape with both ends of said tubing secured against any movement; subjecting said resin soaked into said rovings to a curing operation; removing said tubing from said mandrel; removing said tubing from said resin soaked rovings; and subjecting said resin soaked roving to a final curing operation.

7. A method of fabricating plastic springs comprising the steps of: soaking a length of glass rovings in a bath of liquid resin; inserting a length of the resin soaked rovings into a length of tubing; clamping off a length of said tubing; winding said tubing around a mandrel having a selected configuration to form a coiled structure having a selected shape with both ends of said tubing secured against any movement; curing said resin soaked rovings; removing said tubing from said mandrel; removing said tubing from said resin soaked rovings; cutting said resin soaked rovings to a desired length; and grinding said resin soaked rovings to a finished spring configuration.

8. The method in accordance with claim 7 wherein said resin soaked rovings in said finished spring configuration are preloaded before use.

References Cited in the file of this patent

UNITED STATES PATENTS

| Re. 15,805 | Guay | Apr. 1, 1924 |
| 2,542,593 | Sullivan | Feb. 20, 1951 |
| 2,739,350 | Lampman | Mar. 27, 1956 |
| 2,812,936 | Setz | Nov. 12, 1957 |

FOREIGN PATENTS

| 582,987 | Great Britain | Dec. 4, 1946 |